(12) United States Patent
Giorno

(10) Patent No.: US 12,703,120 B2
(45) Date of Patent: Aug. 11, 2026

(54) VISUAL INDICATION OF COMPOSITE FIBER ORIENTATION

(71) Applicant: Thierry Giorno, Boca Raton, FL (US)

(72) Inventor: Thierry Giorno, Boca Raton, FL (US)

( * ) Notice: Subject to any disclaimer, the term of this patent is extended or adjusted under 35 U.S.C. 154(b) by 1294 days.

(21) Appl. No.: 17/113,019

(22) Filed: Dec. 5, 2020

(65) Prior Publication Data

US 2021/0170617 A1 Jun. 10, 2021

Related U.S. Application Data

(60) Provisional application No. 62/944,684, filed on Dec. 6, 2019.

(51) Int. Cl.
*B26D 3/08* (2006.01)
*B29C 70/54* (2006.01)

(52) U.S. Cl.
CPC ............ *B26D 3/085* (2013.01); *B29C 70/545* (2013.01)

(58) Field of Classification Search
CPC .............................. B26D 3/085; B29C 70/545
See application file for complete search history.

(56) References Cited

U.S. PATENT DOCUMENTS 2,967,010 A * 1/1961 Cuffey, Jr. ............... B65D 5/54 229/940
6,158,663 A * 12/2000 Ochiai .................. B42D 25/00 235/375
6,824,628 B2 11/2004 Anderson et al.
2002/0067751 A1* 6/2002 Ohbuchi ............... H01S 5/0238 372/45.01
2003/0188821 A1* 10/2003 Keller ..................... B29C 43/12 156/286
2007/0092379 A1 4/2007 Coupe et al.
2013/0216770 A1* 8/2013 Gilbertson ........... D03D 25/005 139/408
2014/0260855 A1* 9/2014 Tokura .................. B26D 5/007 83/76.1
2019/0134743 A1* 5/2019 Valette ............... B23K 26/0006
2020/0131840 A1* 4/2020 Green ....................... E06B 3/30

FOREIGN PATENT DOCUMENTS

FR 3050274 A1 10/2017
JP 2019001970 A 1/2019
WO WO-2011042382 A1 * 4/2011 ............. B29C 73/10

OTHER PUBLICATIONS

European Search Report dated Apr. 26, 2021 for EP App No. 21212197.

* cited by examiner

*Primary Examiner* — Liang Dong
(74) *Attorney, Agent, or Firm* — Mechanicus PLLC

(57) ABSTRACT

A method for determining and indicating the orientation of fibers in a selected portion to be removed from a composite stock panel. The method may include determining the orientation of fibers in a composite stock panel based on a pre-existing indicator carried by the stock panel, and applying a fiber orientation indicating mark to at least part of a selected stock panel portion that is to be separated from the stock panel and from the pre-existing indicator, the fiber orientation indicating mark corresponding to the orientation of the pre-existing indicator.

14 Claims, 4 Drawing Sheets

VISUAL INDICATION OF COMPOSITE FIBER ORIENTATION

CROSS-REFERENCES TO RELATED APPLICATIONS

This is a U.S. non-provisional patent application claiming the benefit of priority from U.S. Provisional Patent Application Ser. No. 62/944,684, filed on Dec. 6, 2019, the entire contents of which are hereby incorporated by reference.

FIELD

This application relates generally to the fabrication of parts from composite material.

DESCRIPTION OF RELATED ART INCLUDING INFORMATION DISCLOSED UNDER 37 CFR 1.97 AND 1.98

The orientation of fibers in a composite article may result in wide variation in the article's ability to withstand forces applied at a given angle relative to the article and/or at different locations on the article. For this reason, it's important to be able to ascertain the direction of fiber orientation before forming such an article from a workpiece, and/or after removing that workpiece from a larger stock composite panel.

Fiber orientation in a composite workpiece, or an article fabricated from such a workpiece, can be difficult to determine for various reasons. The composite may, for example, have an opaque layer of resin or paint that obscures the fibers, the fibers may be too fine for their orientation to be easily detectable, and other types of references (such as the rectilinear shape of an unmodified stock panel) may be removed or destroyed during cutting of a stock panel into a workpiece or finished article, or may be unavailable for reference after a workpiece or finished article has been removed from the stock panel. Where the fiber orientation is not readily visible, it may still be detected by known means such as ultrasonic or laser imaging, but such solutions require time and specialized equipment.

SUMMARY

A method for indicating the orientation of fibers in a selected portion to be removed from a composite stock panel comprises the steps of determining the orientation of fibers in a composite stock panel based on a pre-existing indicator carried by the stock panel; applying a fiber orientation indicating mark to at least part of a selected stock panel portion that is to be separated from the stock panel and from the pre-existing indicator, the fiber orientation indicating mark corresponding to the orientation of the pre-existing indicator.

DRAWING DESCRIPTIONS

DETAILED DESCRIPTION

Figures 1, 2:
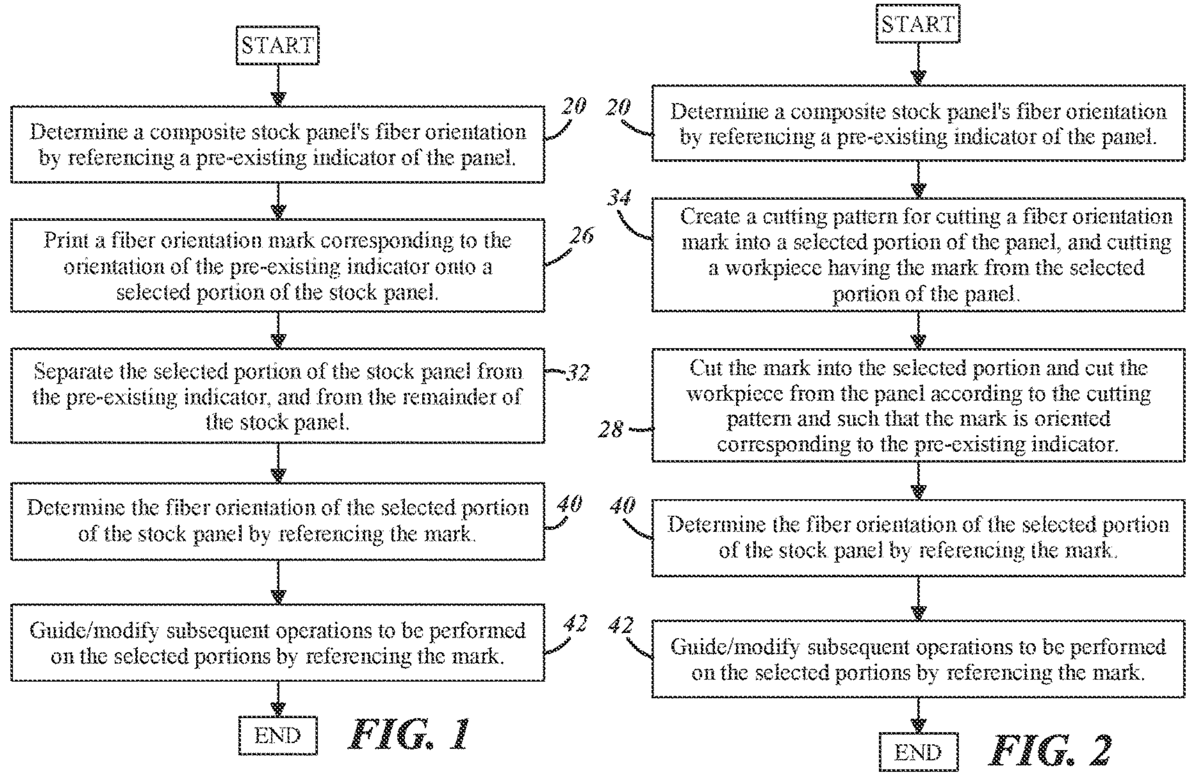
FIG. 1 is a flow chart showing a method for indicating the orientation of fibers in a selected portion to be removed from a composite stock panel.
FIG. 2 is a flow chart showing an alternative method for indicating the orientation of fibers in a selected portion to be removed from a composite stock panel.

The orientation of fibers in a composite material is important to know during various stages of the composite material's fabrication and commercial lifespan. Knowledge of fiber orientation may be useful well after the composite material is formed into commonly-sold units such as stock panels, shown at 10 in FIG. 4, especially during the operations of cutting selected portions 12 such as workpieces 14 from those stock panels 10, transforming those workpieces 14 into finished products or components of such products, installing those products, and end use of the products.

These composite stock panels 10 may be formed from any common composite material combination. For example, a resin or epoxy may be filled with fibers comprising fiberglass or carbon. These fibers need not be precisely aligned to one another; even a general alignment is sufficient to have a significant effect on a composite stock panel's structural qualities.

A method for indicating the orientation of fibers in selected portions 12 (such as workpieces 14) to be separated from a composite stock panel 10 may include the steps of determining the orientation of fibers in the panel 10 via a pre-existing indicator 16, applying one or more fiber orientation marks 18 to one or more selected portions 12 of the panel 10, and then separating the selected portions 12 of the panel from the panel 10 and, consequently, from the pre-existing indicator 16. These steps need not be performed in this order. For example, in one embodiment the application and separation steps may be performed as part of the same process.

Figure 3:
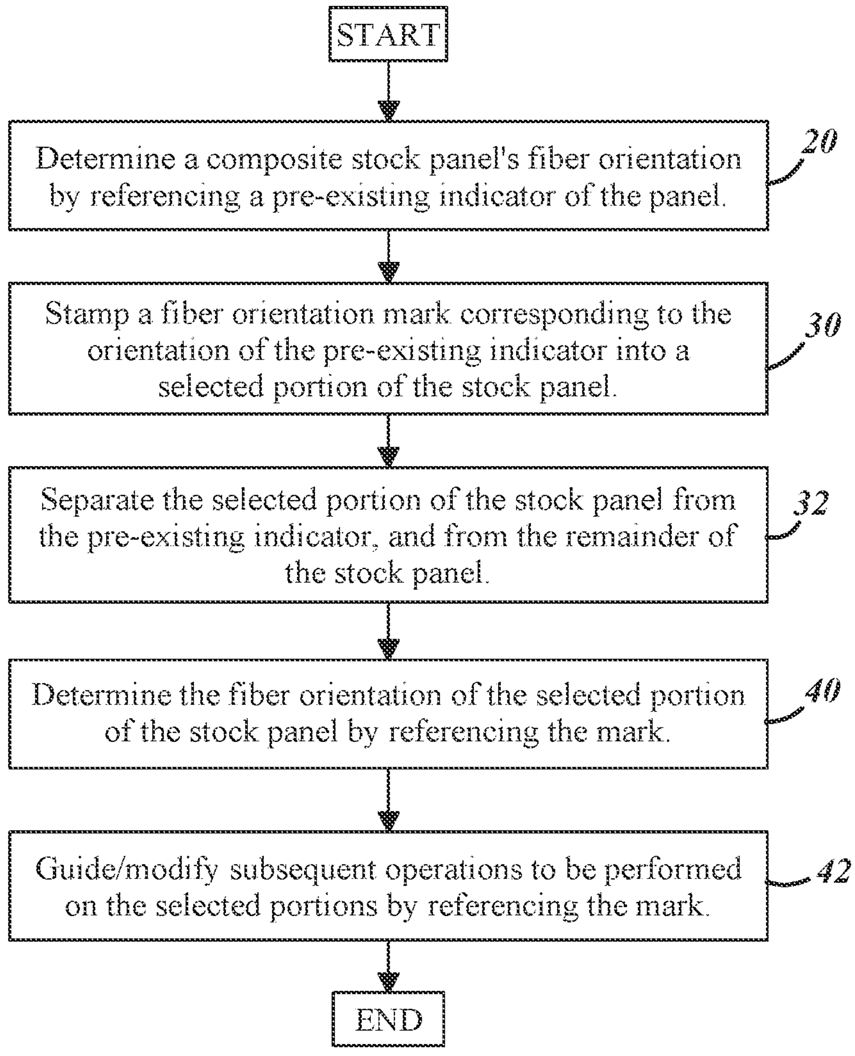
FIG. 3 is a flow chart showing a further alternative method for indicating the orientation of fibers in a selected portion to be removed from a composite stock panel.
Figures 4, 5, 6:
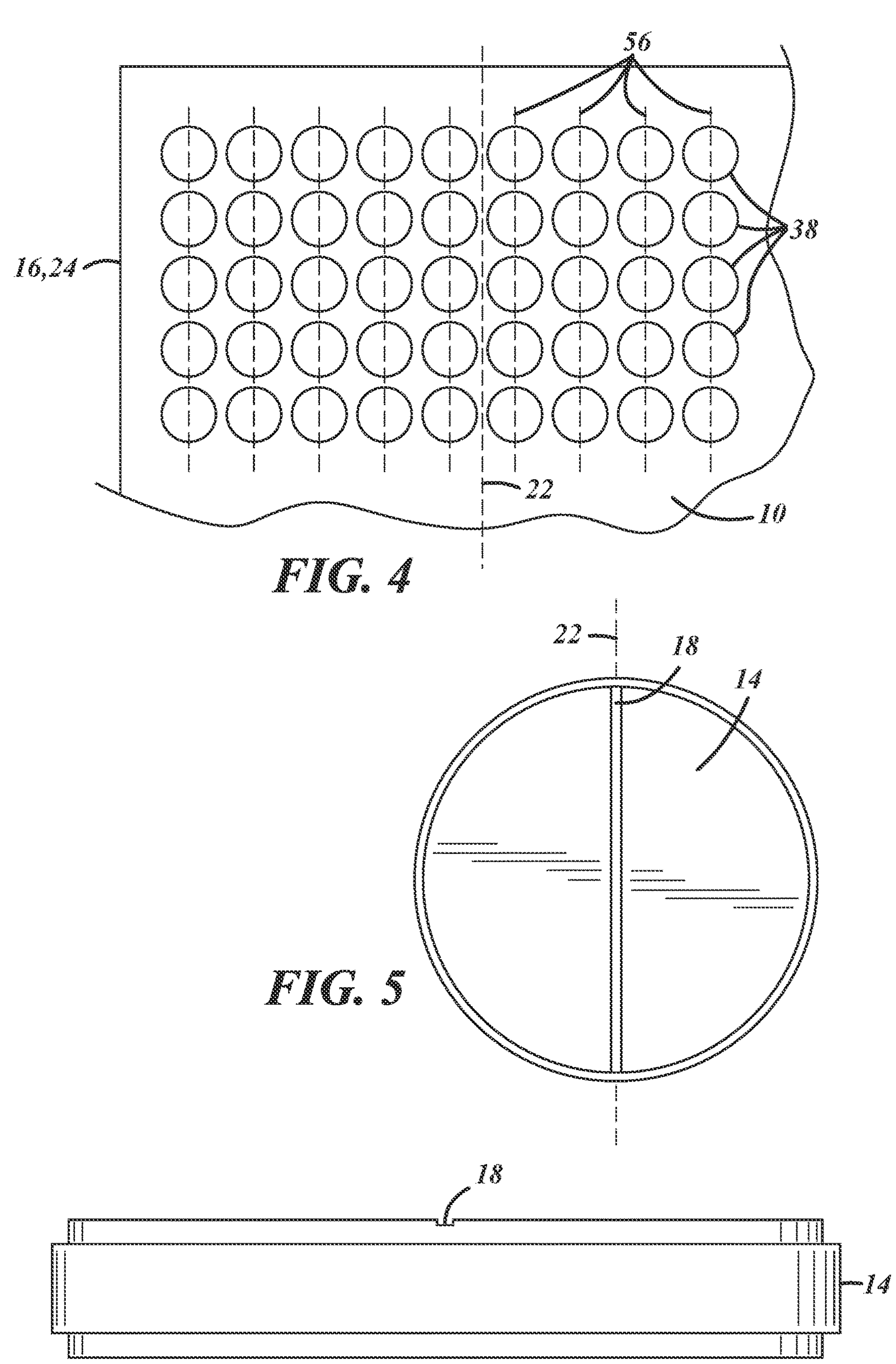
FIG. 4 is a plan view of a composite stock panel showing locations of marks indicating fiber orientation in the composite stock panel and marks showing where selected portions are to be separated from the panel to serve as workpieces that will subsequently be machined into finished articles.
FIG. 5 is a plan view of a workpiece after removal from the panel of FIG. 4 and after the addition of a mark showing fiber orientation.
FIG. 6 is a side view of the workpiece of FIG. 5.

In practice, the step of identifying the orientation of fibers in a composite stock panel 10 may be performed by referencing a pre-existing indicator 16 carried by the composite stock panel 10, as shown in action step 20 of FIGS. 1-3. This pre-existing indicator 16 need not be a mark intentionally left during the composite stock panel's manufacturing process. An indirect clue, such as the shape of the composite stock panel 10, is also suitable. For example: a particular brand of composite stock panels 10 may be known to reliably have a fiber orientation 22 that is, for example, parallel, and/or at right angles to, one or more of the panels' edges 24 (as shown in FIG. 4), allowing one or more of these composite stock panel edges 24 to be used as a pre-existing indicator 16 to identify the orientation 22 of the fibers.

The step of applying one or more fiber orientation indicating marks 18 may comprise applying marks 18 that correspond to the orientation of the pre-existing indicator 16, and that are located at least partially on at least one or more selected portions 12 of the composite stock panel 10. These orientation marks 18 may be applied via one or more additive processes (such as printing or painting new visible material onto the panel 10 as shown in action step 26 of FIG.

Figure 7:
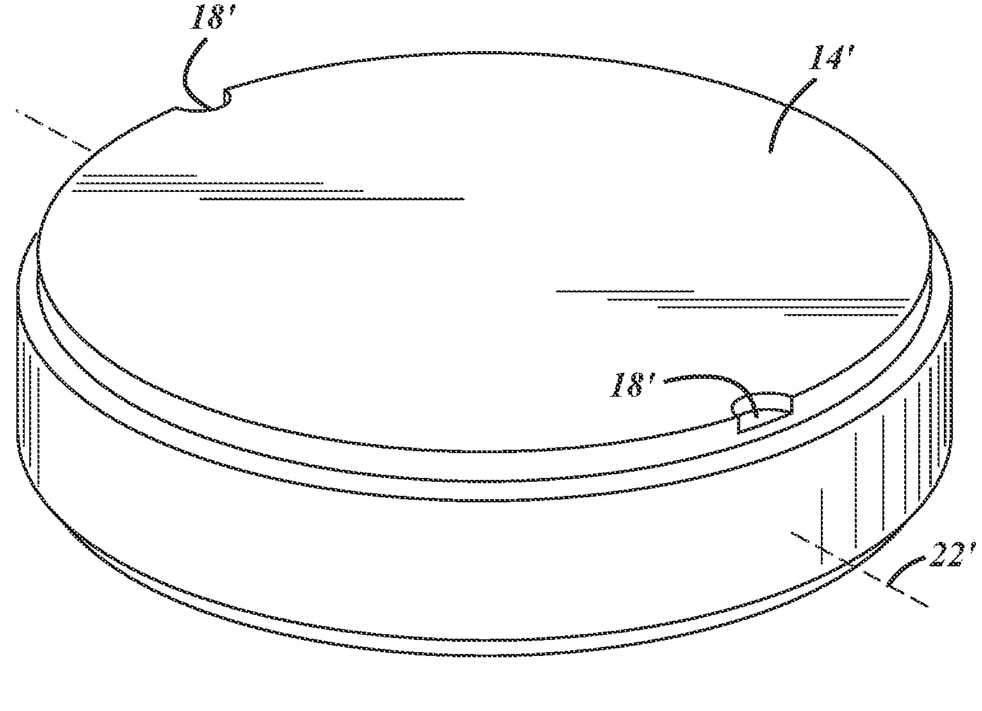
FIG. 7 is a perspective view showing an alternate embodiment of the workpiece of FIGS. 5 and 6, in which the mark indicating fiber orientation comprises a pair of notches.

1), one or more subtractive processes (such as engraving, as shown in action step 28 of FIG. 2) that visibly remove material from the panel 10, or one or more processes that involve otherwise visibly altering the material of the panel 10 (such as burning or stamping as shown in action step 30 of FIG. 3). The marks 18 may comprise anything from a repeating pattern (such as a grid, dot matrix, or the series of lines shown in FIG. 4), to a single symbol (such as an arrow or crosshair), so long as the marks 18 correspond to the pre-existing indicator 16, and are thus indicative of fiber orientation in the composite stock panel 10. In the example shown in FIGS. 5 and 6, the mark 18 comprises a groove running through a generally disk-shaped workpiece 14 that has been cut from a stock panel 10. FIG. 7 shows an alternate exemplary embodiment in which the marks (indicated at 18') comprise two notches made at diametrically opposite ends of a generally disk-shaped workpiece 14' that has been cut from a stock panel 10. The diametrical alignment of the line marks 18 of FIGS. 4-6, and of FIG. 7's notch marks 18', corresponds to the orientation of a pre-existing indicator 16 that has been removed. FIG. 7's use of prime marks with previously defined numbers (for example workpiece 14' in FIG. 7 vs. workpiece 14 in the other figures) indicates that a particular feature is comparable or analogous to a similarly-numbered feature shown in embodiments shown in the other figures. For example, descriptions of workpiece 14 may generally be assumed to apply to workpiece 14', except where precluded elsewhere in the description or figures.

The selected portions 12 of the composite stock panel 10 are eventually separated from the composite stock panel 10 and from the pre-existing indicator 16, as shown in action step 32 of FIGS. 1 and 3, preventing the use of the pre-existing indicator 16 to determine fiber orientation 22 in the separated selected portions 12. Separation of the selected portions 12 from the stock composite stock panel 10 may comprise discarding the part of the panel 10 that includes the pre-existing indicator 16 after the selected portions 12 of the composite stock panel 10 have been cut out from the composite stock panel 10 to serve as workpieces 14 to be formed into finished articles. However, this separating step may be performed by any operation that prevents the pre-existing indicator 16 from being easily or reliably used to determine the orientation of fibers in the selected portions 12 of the composite stock panel 10.

The step of applying one or more fiber orientation indicating marks 18 may comprise applying the marks 18 to the selected portions 12 of the composite stock panel 10 while cutting or otherwise separating the selected portions 12 from the composite stock panel 10 to serve as workpieces 14. According to action step 34 of FIG. 2, this may be accomplished by adding some representation of the marks and their desired locations on a composite stock panel 10, to a blueprint, computer assisted design (CAD) file, or any other cutting pattern suitable for guiding tools or technicians in creating such marks 18 in or on a composite stock panel 10 and/or in cutting or otherwise separating selected portions 12 from the composite stock panel 10 to serve as workpieces 14. This blueprint, file, or pattern may then be used to guide a milling machine to, for example, cut the selected portions 12 from the composite stock panel 10 and/or to cut the marks 18 into the selected portions 12 of the composite stock panel 10. As shown in action step 28 of FIG. 2, the cutting of the selected portions 12 and marks 18 may be performed in a single manufacturing operation. In the course of such an operation, the marks 18 may be cut or otherwise formed while the selected portions 12 are cut or otherwise separated from the composite stock panel 10 and from portions 12 of the composite stock panel 10 that include or comprise the pre-existing indicator 16. In some embodiments the marks 18 may expand across, or be repeated across an entire surface, or even all surfaces of, the composite stock panel 10. In other embodiments, the mark or marks 18 may only be applied to one or more selected portions 12 of the composite stock panel 10. Where multiple fiber orientations are present (for example, if a workpiece 14 comprises a composite of several fiber layers having different fiber orientations 22), multiple sets or types of marks 18 may be used to depict each fiber orientation 22 of each fiber layer within a workpiece 14.

As shown in FIG. 4, a plan view or "blue print" used in forming the marks 18 and cutting-out the selected portions 12 may include straight lines 36 showing where the marks 18 indicating fiber orientation are to be cut into selected portions 12 of the stock panel 10. In this example, the blue print may also include circular lines 38 showing where the selected portions 12 are to be cut from the stock panel 10 in the form of disk or puck-shaped workpieces 14. As is also shown in FIG. 4, the lines 36 indicating fiber orientation may run through each of the circular lines 38 indicating where the selected portions 12 are to be cut from the panel 10. Before each workpiece 14 is machined via computer aided machining (CAM) into a final product, the CAM device references the marks 18 that visually indicate fiber orientation (in this case, the straight lines) on each puck-shaped workpiece 14, to ensure that the workpiece 14 is in the optimum orientation to be cut and/or milled into a finished article, as shown in action step 40. Beyond this example, the same method may be followed in a similar fashion using other types of marks 18 and/or workpiece shapes.

Once the marks 18 are applied, the fiber orientation 22 in the selected portions 12 may be determined by referencing the marks 18 as shown in action step 40 of FIGS. 1-3. And where the selected portions 12 are to serve as workpieces 14 and are thus subject to further operations such as cutting, bending, or assembly, as shown by action step 42 of FIGS. 1-3, these further operations may be modified via reference to the marks for various purposes. For example, the marks 18 may be referenced in a cutting operation to orient the workpieces 14 in such a way that the direction of cuts will not threaten the structural integrity of the workpieces 14. In other words, the marks 18 allow for optimal positioning of each workpiece 14 in a milling machine for fabrication of a finished article. As another example, an assembly operation may comprise using the marks 18 as a guide to ensure that each of the finished articles fashioned from the workpieces 14, is installed in an assembly such that its fibers are aligned in a direction that will optimize the assembly's ability to handle anticipated loads to be applied to the finished article.

According to these methods, pre-existing fiber orientation indications on stock panels may be used as references to provide corresponding orientation marks on workpieces and components, which are better suited for the idiosyncratic placement and shape of the workpieces and components that a user may wish to produce from the stock panel. This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A method for indicating an orientation of fibers in a selected composite stock panel portion to be removed from a composite stock panel;

the method comprising the steps of:

determining the orientation of fibers in the composite stock panel by referencing a preexisting indicator carried by the composite stock panel;

applying a fiber orientation indicating mark to at least part of the selected stock panel portion that is to be separated from the composite stock panel and from the pre-existing indicator, the fiber orientation indicating mark corresponding to the orientation of the pre-existing indicator; and determining the fiber orientation in the selected composite stock panel portion by referencing the mark.

2. The method of claim 1 in which the step of applying the fiber orientation indicating mark comprises adding a substance to the selected composite stock panel portion.

3. The method of claim 1 in which the step of applying the fiber orientation indicating mark comprises removing material from the selected composite stock panel portion.

4. The method of claim 1 in which the step of applying the fiber orientation indicating mark comprises visibly altering the material of the selected composite stock panel portion.

5. The method of claim 1 in which the step of applying the fiber orientation indicating mark comprises cutting the mark into the selected composite stock panel portion and separating the selected composite stock panel portion from the composite stock panel in a single operation, the mark being cut at least partially into the selected composite stock panel portion.

6. The method of claim 5 including an additional step of creating and applying a cutting pattern to the composite stock panel, and in which the step of cutting the selected composite stock panel portion from the composite stock panel and cutting the mark into the selected composite stock panel portion in a single operation includes using the cutting pattern to guide the cutting.

7. The method of claim 1 includes an additional step of removing the pre-existing indicator from at least part of the selected composite stock panel portion in the course of separating the selected composite stock panel portion from the composite stock panel.

8. The method of claim 1 in which the step of applying the fiber orientation indicating mark comprises applying the mark across an entire face of the composite stock panel.

9. The method of claim 1 in which the step of applying the fiber orientation indicating mark comprises applying the mark only to the selected composite stock panel portion.

10. The method of claim 1 including an additional step of using the determined fiber orientation to modify further operations to be performed on the selected composite stock panel portion.

11. A method for indicating an orientation of fibers in a selected composite stock panel portion to be removed from a composite stock panel; the method comprising the steps of:

determining the orientation of fibers in the composite stock panel by referencing a preexisting indicator carried by the composite stock panel;

applying a fiber orientation indicating mark to at least part of the selected stock panel portion that is to be separated from the composite stock panel and from the pre-existing indicator, the fiber orientation indicating mark corresponding to the orientation of the pre-existing indicator;

separating the selected panel portion from the composite stock panel; and modifying the directional orientation of the selected panel portion, after the separation step, by referencing the fiber orientation indicating mark.

12. A method for indicating an orientation of fibers in a selected composite stock panel portion to be removed from a composite stock panel; the method comprising the steps of:

determining the orientation of fibers in the composite stock panel by referencing a preexisting indicator carried by the composite stock panel;

applying a fiber orientation indicating mark to at least part of the selected stock panel portion that is to be separated from the composite stock panel and from the pre-existing indicator, the fiber orientation indicating mark corresponding to the orientation of the pre-existing indicator;

separating the selected panel portion from the composite stock panel; and modifying a manufacturing operation involving the selected panel portion, after the separation step, by referencing the fiber orientation indicating mark.

13. The method of claim 12 in which the pre-existing indicator ceases to indicate the fiber orientation of the selected panel portion prior to executing the step of modifying a manufacturing operation.

14. The method of claim 12 in which the step of separating the selected portion from the composite stock panel renders the pre-existing indicator unusable for indicating the fiber orientation of the selected panel portion.

* * * * *